United States Patent [19]
Garfinkle et al.

[11] 3,921,741
[45] Nov. 25, 1975

[54] BICYCLE WITH ELECTRIC MOTOR ASSIST

[75] Inventors: Irwin P. Garfinkle; Robert J. McNair, both of Cincinnati, Ohio

[73] Assignee: Avco Corporation, Cincinnati, Ohio

[22] Filed: July 11, 1974

[21] Appl. No.: 487,522

[52] U.S. Cl. .............. 180/34; 290/16; 290/45; 318/139; 180/65 R
[51] Int. Cl.² .......................................... B60K 1/04
[58] Field of Search ..... 180/34, 27, 33 C, 67, 65 A, 180/65 R; 290/16, 45; 318/139; 320/61

[56] References Cited
UNITED STATES PATENTS

| | | | |
|---|---|---|---|
| 552,271 | 12/1895 | Bolton | 180/34 |
| 656,323 | 8/1900 | Hansel | 180/34 |
| 2,179,418 | 11/1939 | McDonald | 180/34 X |
| 3,530,356 | 9/1970 | Aronson | 320/61 |
| 3,533,484 | 10/1970 | Wood | 180/34 X |
| 3,792,742 | 2/1974 | Mager | 318/139 X |

*Primary Examiner*—Kenneth H. Betts
*Assistant Examiner*—R. Schrecengost
*Attorney, Agent, or Firm*—Charles M. Hogan

[57] ABSTRACT

A pedal-operable bicycle is provided with supplemental electric power means to assist the operator in traversing hilly terrain. The electric power means comprises a storage battery, a wheel-hub mounted direct current motor operated either as a motor or a generator, and handle bar actuated electronic control means for applying power to energize the motor or to connect it as a generator to recharge the battery when traveling downgrade and/or to brake the vehicle to a slower speed. An alternate arrangement using a separate motor and generator is also disclosed.

7 Claims, 5 Drawing Figures

BICYCLE WITH ELECTRIC MOTOR ASSIST

BACKGROUND OF THE INVENTION

The present invention relates to the use of electric power units to assist a bicycle rider in pedaling up hills. Power is extracted from a storage battery when the bicycle is going upgrade. Conversely, the battery is recharged by an electric generator when the bicycle goes downgrade and when braking to a stop. Thus, bicycles incorporating this invention conserve battery power by drawing energy therefrom only to supplement the work being done by the rider. Secondly, charge is restored to the battery by making use of the potential energy that can be extracted from the bicycle-rider combination when going downgrade and/or stopping.

Prior art electrically driven vehicles have employed battery operated motors. Typical prior art patents include the following: U.S. Pat. Nos. 3,773,131; 3,598,195; 3,533,484; 2,397,115; 2,179,418; 656,323; 627,066 and 547,441. In some of the above, foot-operated bicycles have been convertible to an electrically operated status. Motors have also been mounted within the wheel of the vehicle and in one case an eddy current brake has been used. In these previous art cases, the energy drain from the battery was not minimized by the use of pedal and motor power in combination concurrent with the use of a generator to recharge the battery while enroute.

SUMMARY

A compact battery-powered electric motor-driven unit is used to supplement the conventional pedal drive of a bicycle. Provision is made to partially recharge the battery during deceleration of the vehicle and when going downhill. Overall weight of the vehicle is held to a minimum. By holding down the vehicle weight, the size of the storage battery needed to power the vehicle is also reduced. Further, to reduce current consumption, as far as possible, the vehicle is equipped with an efficient low mass direct current motor having permanent magnet field pieces. The motor is integrally mounted in the hub of the rear wheel of the bicycle. Clutch and gear means are incorporated so that the conventional pedal drive can be used. Use of pedal power on starting and when traveling on level terrain reduces consumption of battery power. Using both motor and pedal power drive when going uphill tends not only to reduce consumption of battery energy but also provides operation with the least amount of exhaustion for the rider. Controls are provided so the operator can manually adjust the amount of electric power assistance he wishes to add to his pedal power.

Dynamic braking of the bicycle is used when going down hill or slowing to a stop. The energy derived from conversion of vehicular kinetic energy to electric power is returned as charge to the battery. Rate of deceleration and hence the instantaneous charging rate into the battery is under operator control.

An alternate embodiment uses separate motor and generator units connected via magnetic clutch and gear mechanisms to a ring gear integrally mounted in the rear wheel hub of a bicycle. In this configuration, the wheel of the vehicle can be made to turn at a slower rate than the shaft of either the motor or the generator. Clutching the motor or the generator into service on a need basis serves to minimize both wear and friction losses. Since use of all electric assemblies is on an intermittent basis, size of both the motor and the generator can be kept to a minimum.

The net result of this invention is to provide a light weight motor assisted bicycle which is easy to ride and operate.

DESCRIPTION OF PREFERRED EMBODIMENTS

Figure 1:
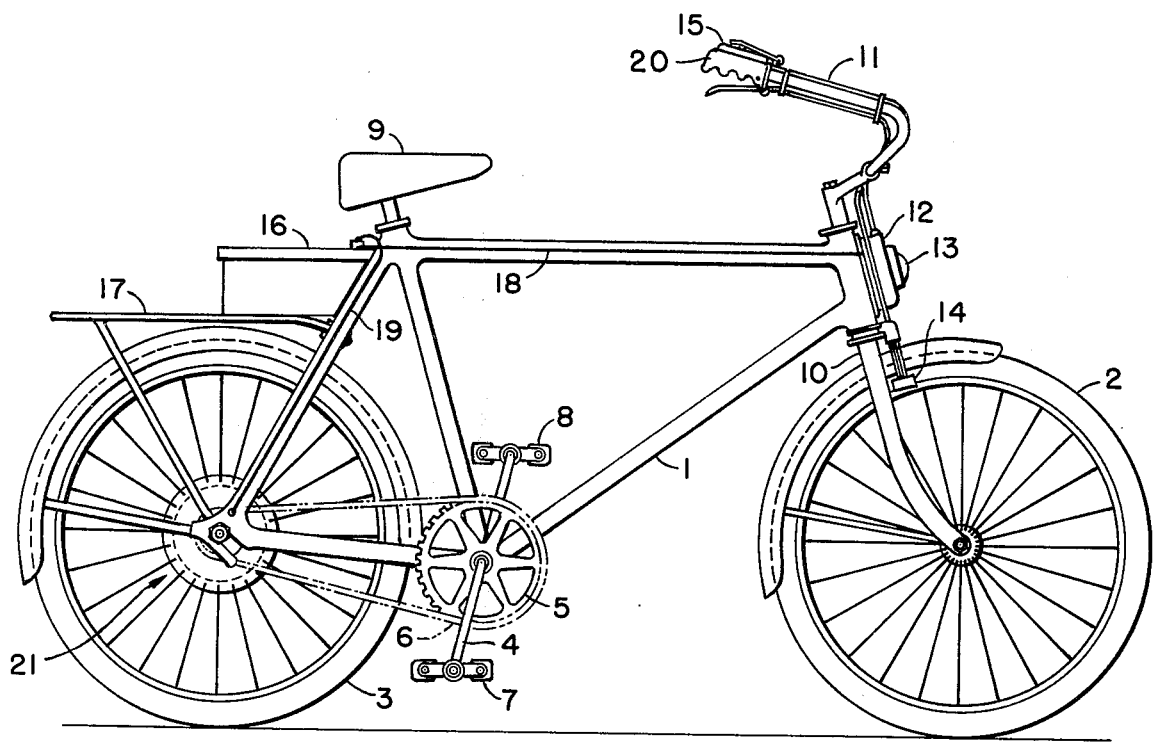
FIG. 1 represents a bicycle which has been equipped with an electrical power unit in accordance with the teachings of this invention.

The bicycle shown in FIG. 1 is made up of the well known type of frame 1, wheels 2–3, crank shaft 4, sprocket wheel 5, chain 6, pedals 7–8, saddle 9, front fork 10 and handle bars 11 commonly used in the art. On the fore vertical portion of the frame, just in front of and slightly below the level of the handle bars is mounted a small case 12 which contains all of the electronic control circuitry. Integral with case 12 and facing in the forward direction is headlamp 13. A mechanical caliper type brake 14 is incorporated so as to be operable from the left handle grip 15. Battery case 16 is mounted aft of the saddle at the upper end of the frame post. Utility shelf 17 is made integral with and serves to partially support the weight of the battery in case 16.

The central hub of rear wheel 3 contains the electric motor which powers the vehicle. Cables to feed current between the battery, the motor and the control unit are run along the outside of the frame members in protected raceways 18–19.

Figure 2:
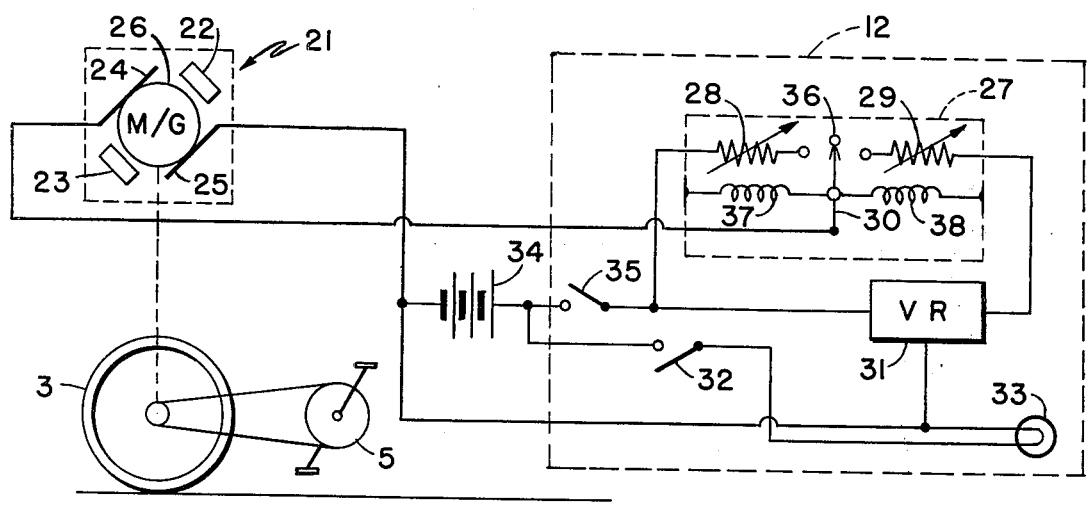
FIG. 2 is a schematic, partially in block diagram form, showing the electric power unit interconnections and control circuits.

Referring now to the schematic drawing in FIG. 2, there is shown the circuitry associated with the electric powered drive unit. Motor unit 21 is located in the hub of rear wheel 3. Permanent magnets 22 and 23 serve as field poles of the motor. Brushes 24 and 25 ride against the commutator of armature 26. Battery 34 is activated by means of switch 35. Between switch 35 and the motor is control unit 27. Control unit 27 is actuated by means of the right handgrip 20 of handle bar 11 (see FIG. 1). Rotation of the handgrip in a clockwise direction serves to adjust rheostat 28 of control unit 27. The handgrip is spring loaded by springs 37 and 38 so that when the bicycle rider releases the handgrip, it automatically returns wiper arm 30 to neutral position 36. Rotation of the handgrip in a counterclockwise direction moves wiper arm 30 so as to adjust the value of rheostat 29. Clockwise rotation of the right handgrip thus serves to control the amount of power fed from battery 34 to motor 21. Functionally, the further clockwise the handgrip is rotated, the faster the motor will run. Rotatable handgrips of this type are common to the motorcycle art and hence, a rider of the bicycle of this invention will have no difficulty in becoming skilled in its operation.

When braking to a stop or desiring to keep from going too fast down hill, the bicycle rider will turn his right handgrip in a counterclockwise direction from the neutral position. This turns the motor in the rear hub into a dynamic brake. Energy generated as a result of the braking function is passed through rheostat 29 to voltage regulator 31 and then returned as charge to storage battery 34. The amount of dynamic braking and hence vehicle deceleration is directly controlled by how far the handgrip is rotated in the counterclockwise direction.

Switch 32 connects battery voltage to bulb 33 which is located in headlamp 13 (FIG. 1).

Figure 3:
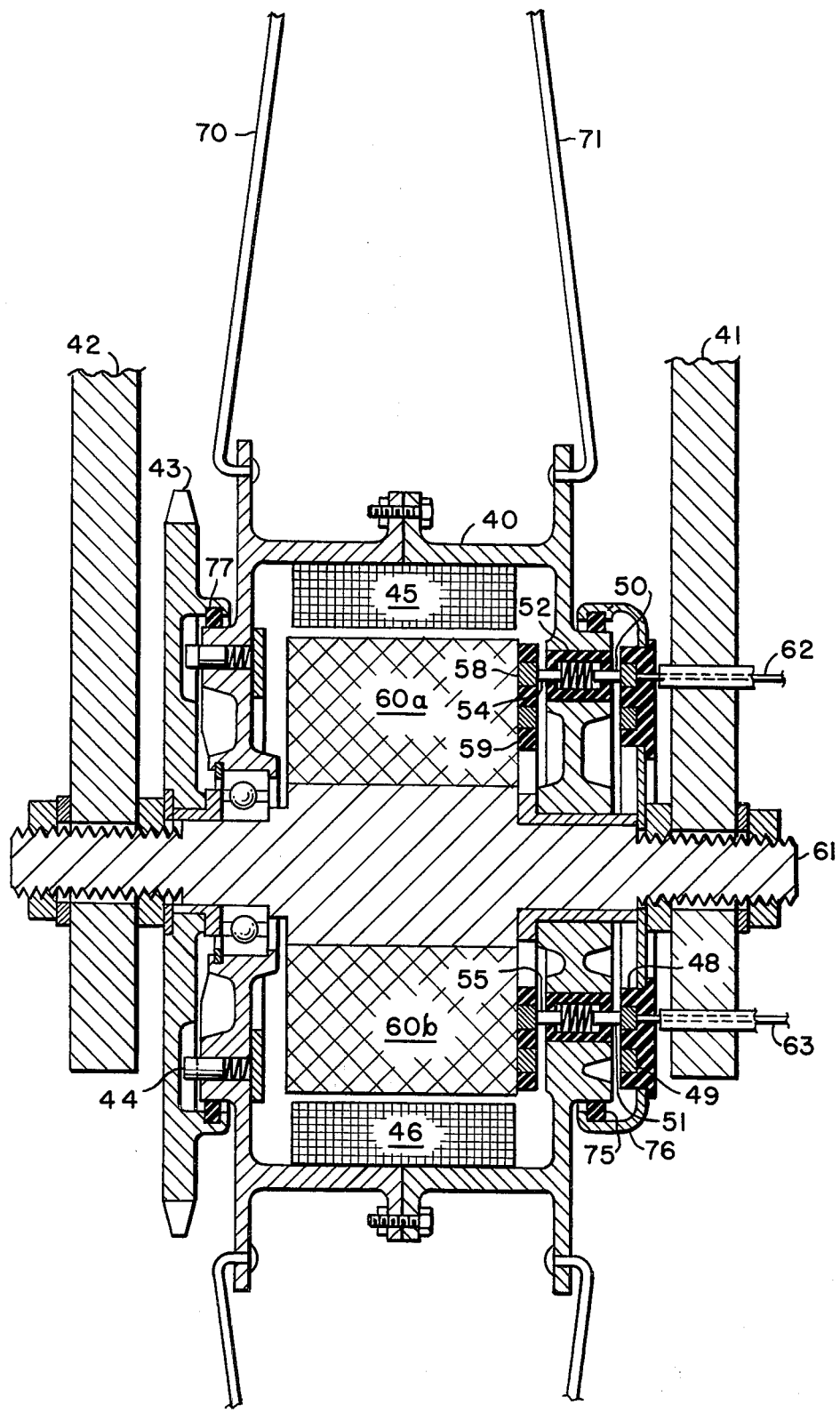
FIG. 3 is a cross-sectional view of the rear wheel hub, showing the electric motor and its operative features.

Referring now to FIG. 3, there is shown a cross sectional view of the rear hub of the bicycle. The hub assembly attaches to the rim of the rear wheel via spokes pictorially shown as 70–71. The assembled wheel rigidly clamps in frame members 41 and 42, via nuts at the ends of axial shaft 61.

Pedal power is delivered to the rear wheel via gear 43. Conventional ratchet pawl 44 and its companions prevent drive of crank member 4 (see FIG. 1) by the rear wheel.

The electric motor is coaxially situated within hub shell 40. A clamped rotor type motor is used. The rotor with windings shown at 60a and 60b is clamped fast and the case of the motor is caused to rotate. Rotation of the case is made possible by the use of two sets of brushes. One set 54–55 contacts armature commutator segments 58–59. The other set of brushes 50–51 ride on slip rings 48–49. Current is fed to and from slip rings 48–49 by conductors 62 and 63. Motor pole pieces 45 and 46 are of the permanent magnet type and hence there is no need for field coils. Application of voltage via wires 62–63 causes the motor case or rear wheel hub to begin to turn. Both the commutator and the slip ring brushes rotate with the motor housing. Since the brushes are axially arranged as shown in FIG. 3, there is no tendency for centrifugal force to raise the brushes from the commutator as would be the case in a conventionally built motor. This allows use of a simple spring 52 to accomplish maintenance of proper axial brush tension.

Slip rings 48–49 are integral with metal cup 75 which is rigidly affixed to central shaft 61. Circular seals 76 and 77 prevent entrance of dirt and contaminants into the mechanism.

Figure 4:
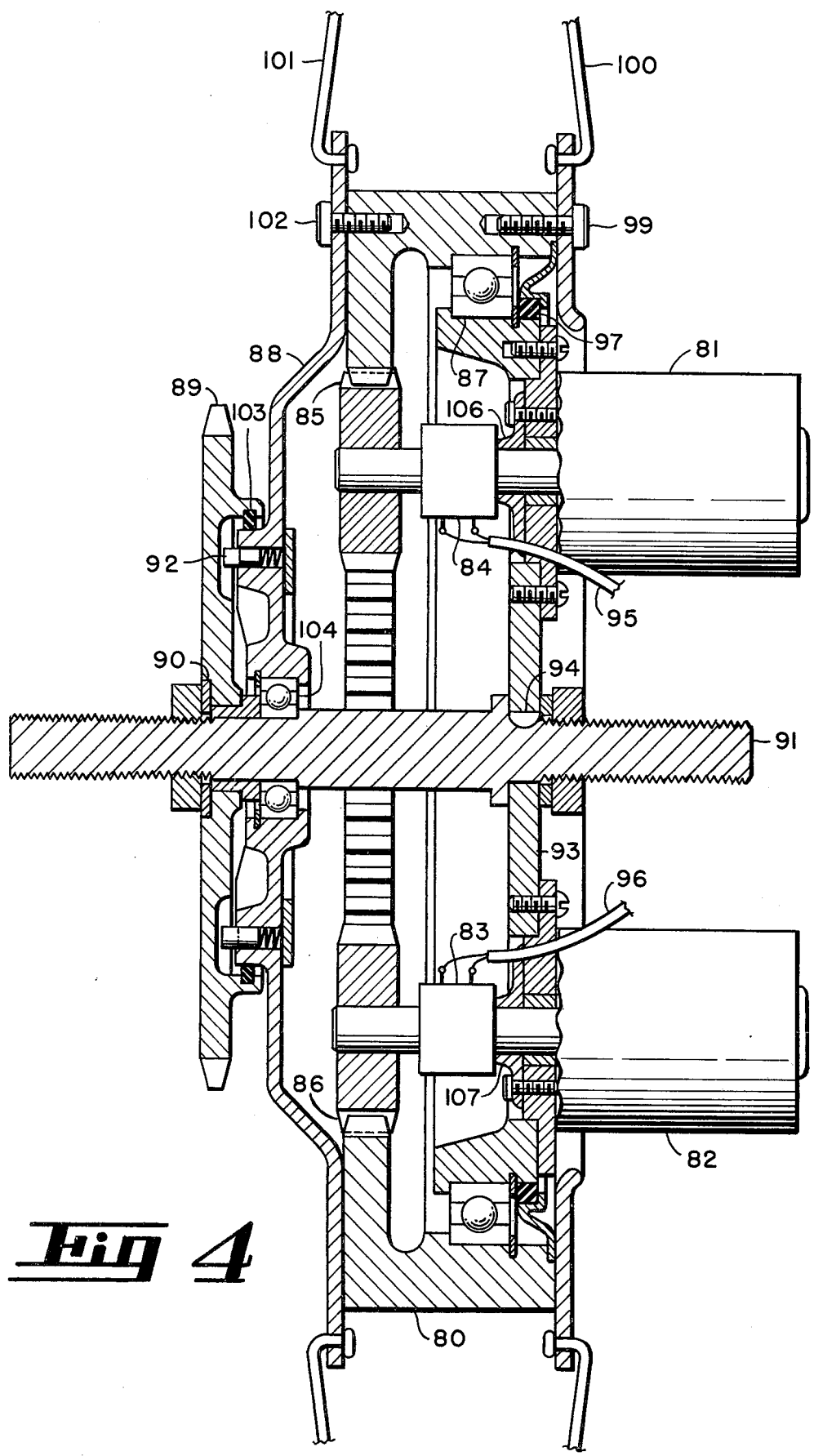
FIG. 4 is a cross-sectional view of a rear wheel hub, showing an alternate implementation of the invention wherein separate motor and generator units are selectively coupled to the drive wheel by clutch and gear means.

An alternate implementation of the invention is shown in FIG. 4. The entire FIG. 4 assembly is interchangeable with the rear hub of the bicycle shown in FIG. 1. In the FIG. 4 implementation, a separate drive motor 81 and generator 82 are used. Drive motor 81 powers the vehicle via magnetic clutch 84, gear 85 and ring gear 80. Ring gear 80 also serves as the main structural member of the rotating assembly in that the weight of the vehicle is mainly supported by ball bearing race assembly 87. The inner race of the bearing assembly 87 rests on disk assembly 93. Ports cut in disk 93 serve as connecting mounts for motor 81 and generator 82. Magnetic clutches 83 and 84 are secured to the front of motor 81 and generator 82 by means of screws and flanges 106 and 107.

Disk assembly 93 is rigidly pinned to axle shaft 91 by means of key 94. At the left end of axle 91 is shown gear 89 which is operated by pedaling the vehicle. Gear 89 is supported on axle shaft 91 by means of bearing 90 which is secured to gear 89 by spot welding or other conventional means. Override clutch 92 allows gear 89 to drive the rear wheel of the vehicle but prevents the gear from being driven by the wheel. Ring gaskets 97 and 103 prevent leakage of lubricant from the rear hub and also keep out dirt. Ball bearing 104 serves to better stabilize the rotating assembly on axle 91.

Operation of the vehicle with the assembly shown in FIG. 4 provides several advantages. First, the motor can be made to rotate at a higher rate of speed than the drive wheel. At a vehicular speed of about 10 mph the drive wheel turns at only about 120 rpm. By using a gear ratio of 4 to 1, as in the configuration of FIG. 4, the motor can be made to turn at almost 500 rpm when the vehicle is moving at relatively slow speeds. Second, since both the motor and the generator are used intermittently, the size of each can be kept small without causing undue heat buildup. This both reduces initial cost and keeps the vehicle weight to manageable levels.

Operation of the vehicle having the FIG. 4 equipment is the same as for the embodiment of FIGS. 1–3. For operation by pedal power alone, magnetic clutches 83 and 84 are unenergized. When electric motor assistance is desired, magnetic clutch 84 is energized by means of electric cable 95 which is connected across the battery supply at the same time as energy is fed to the motor. This can be readily accomplished using a control unit of the same design as shown in FIG. 2, unit 32.

Figure 5:
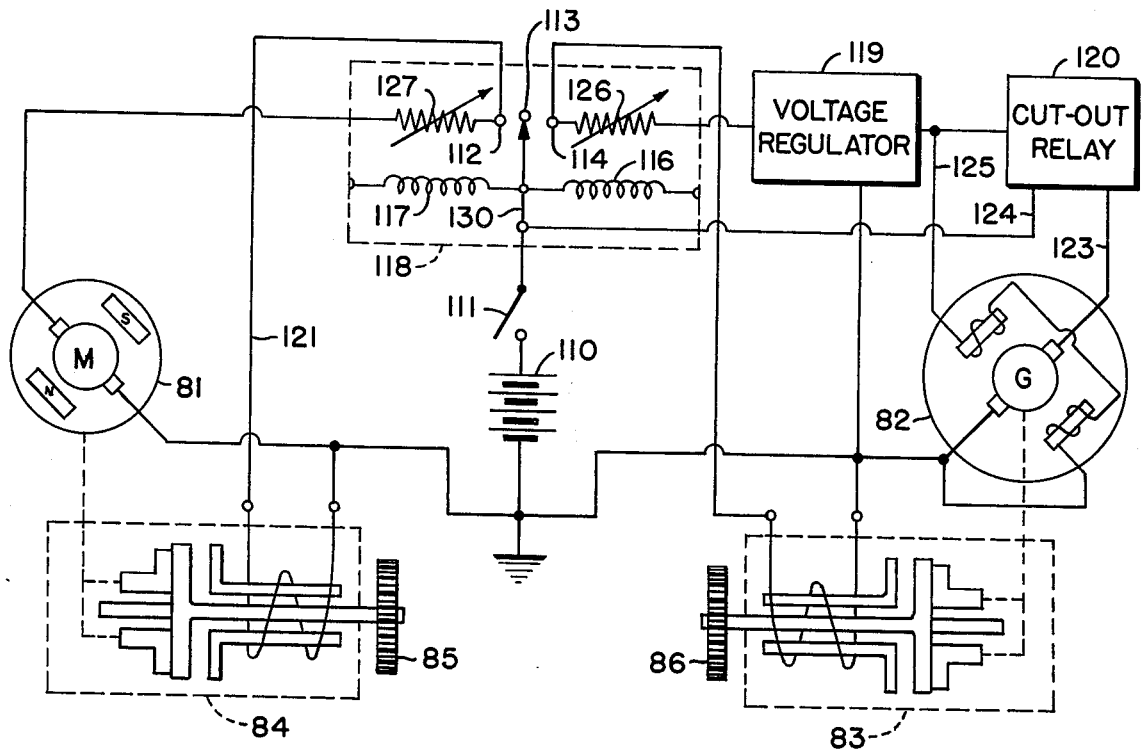
FIG. 5 is a schematic, partially in block diagram form, showing the power unit and control circuit interconnections for the case where separate motor and generator units are used.

FIG. 5 shows the control circuit for the implementation of the type shown in FIG. 4. In most respects it is similar to the circuitry shown in FIG. 2. Battery 110 is activated by master switch 111. Control 118 has a neutral position 113 which is mechanically biased by springs 116 and 117. When wiper arm 130 is moved left so as to make contact with element 112, current begins to flow both through motor 81 and magnetic clutch 84 via wire 121. Power for propelling the vehicle is passed from motor 81 through clutch 84 and on to gear 85 which mechanically meshes with the ring gear in the hub of the rear wheel. Energy fed to the motor is controlled via variable resistive element 127. As a fail-safe feature, release of control 118 by the operator will stop the motor and de-energize the magnetic clutch.

Use of the system as a generator with which to partially recharge the battery, is accomplished by moving control lever 130 in the opposite direction. Assume that the vehicle is moving along at 20 mph. Gear 86 will be rotating at approximately 1000 rpm. Movement of contact arm 130 to the right will energize magnetic clutch 83 as soon as point 114 is reached. Energizing clutch 83 will bring generator 82 up to the same speed as gear 86. Movement of arm 130 to the right also causes current to flow through variable resistor 126 which is connected to voltage regulator 119. Voltage regulator 119, in turn, controls the current through the field windings of generator 82. With the armature spinning and field current applied along line 125, a voltage begins to appear on line 123 which connects generator 82 to cut-out relay 120. When the voltage from the generator surpasses that of battery 110, the relay contacts in unit 120 close and charging current flows on line 124. Rate of charge and hence vehicle deceleration is controlled by the instantaneous position of variable resistor 126. Cut-out relay 120 is needed to keep energy from flowing from the battery to the generator.

While two embodiments of this novel invention have been described, there are many variations and modifications which will be apparent to those skilled in the art. For example, the device is described as essentially for a two-wheeled vehicle. It is equally applicable for three-wheeled pedal vehicles. Operational control of the vehicle has been described as using a rotatable right handgrip with a clockwise twist needed to apply power to the motor and a counterclockwise twist used for dynamic braking and battery recharge. Other control means would be equally possible. For example, a joystick type lever mounted along the handle bar or on the frame member would work. Another control variation might use power diodes automatically controlled by a sensor connected to the vehicle speedometer. Other refinements and variations will expand the utility of this invention.

We claim:
1. An electric power assisted vehicle comprising:
 a frame;
 wheels rotatably mounted on said frame;
 a pedal system for driving at least one of said wheels, said driving system including an overdrive clutch mechanism which permits the pedals to power said drive wheel while at the same time preventing the pedals from being driven by said wheel;
 drive motor means connected to said one wheel;
 voltage generator means coupled to one of said wheels;
 a rechargeable battery source; and
 electric power connecting means selectively coupling said battery source to said motor or said generator, said electric power connecting means including a combination motor and generator control unit, said unit having separate motor and generator control sections therein, each comprising manually variable current regulating resistor elements, each having a power disconnected position, and including means for biasing said resistor elements to said power off position when released by an operator.

2. A vehicle according to claim 1 wherein the drive motor is of the slot-wound clamped rotor type and is integrally mounted in the wheel hub.

3. A vehicle according to claim 1 wherein said drive motor means and said generator means comprise a permanent magnet motor which is convertible to a generator in its driven state.

4. A vehicle according to claim 1 wherein said drive motor means and generator means are separate units, and means are provided for selectively clutching one or the other of said units.

5. A vehicle according to claim 1 wherein the current regulating resistor elements respectively provide proportional control of said drive motor and said generating means.

6. A vehicle according to claim 1 wherein said vehicle is a bicycle.

7. A vehicle according to claim 1 wherein said control means includes means for converting said drive motor to a dynamic brake.

* * * * *